United States Patent

[11] 3,596,103

[72] Inventors Klon E. Matthews
St. John, Kans.;
James H. Hood, 713 N. Main, St. John, Kans. 67576
[21] Appl. No. 776,402
[22] Filed Nov. 18, 1968
[45] Patented July 27, 1971

[54] MULTIPLE TIMING APPARATUS FOR TRACK EVENTS AND THE LIKE
13 Claims, 16 Drawing Figs.

[52] U.S. Cl. .................................................. 250/221,
200/61.93, 250/222 R, 272/4, 340/258 B
[51] Int. Cl. ...................................................... A63k 1/00,
G06m 7/00
[50] Field of Search ........................................... 250/221,
222, 223; 340/258 B, 323; 200/61.93, 61.08;
272/4, 5, 59

[56] References Cited
UNITED STATES PATENTS
2,208,721  7/1940  Demosthenes ............... 200/61.93
2,291,022  7/1942  Burbridge ...................... 200/61.08
2,319,420  5/1943  Macksoud ...................... 250/221
2,351,707  6/1944  Rouprich ....................... 250/221
3,046,519  7/1962  Polster .......................... 340/258
3,230,327  1/1966  McDowell ...................... 200/61.08

Primary Examiner—James W. Lawrence
Assistant Examiner—T. N. Grigsby
Attorney—John H. Widdowson ABSTRACT: This invention is a multiple timing apparatus operable through the use of electronic beams to record individual times of various items such as normally found in track running events. This invention is a multiple timing apparatus including a support frame; amplifier device mounted upon the support frame; a photocell assembly mounted within the supporting surface in cooperating alignment with the amplifier device; a control panel operably connected to the photocell assembly and the amplifier device; and a control panel operably connected to the photocell assembly and the amplifier device to automatically record various points at which the respective photocell beams are broken. Other embodiments of this invention concern the use of mechanical means for breaking a circuit to actuate a stopwatch or the like used in athletic events. Still, more specifically, this invention relates to the use of an electronic source such as a photocell or ultrasonic beam or a mechanical means whereupon the breaking of the same operates to actuate a timing mechanism to accurately record the time at which such beam or mechanical structure was broken.

PATENTED JUL 27 1971

INVENTORS
JAMES H. HOOD &
KLON E. MATTHEWS
BY
John H. Widdowson
ATTORNEY

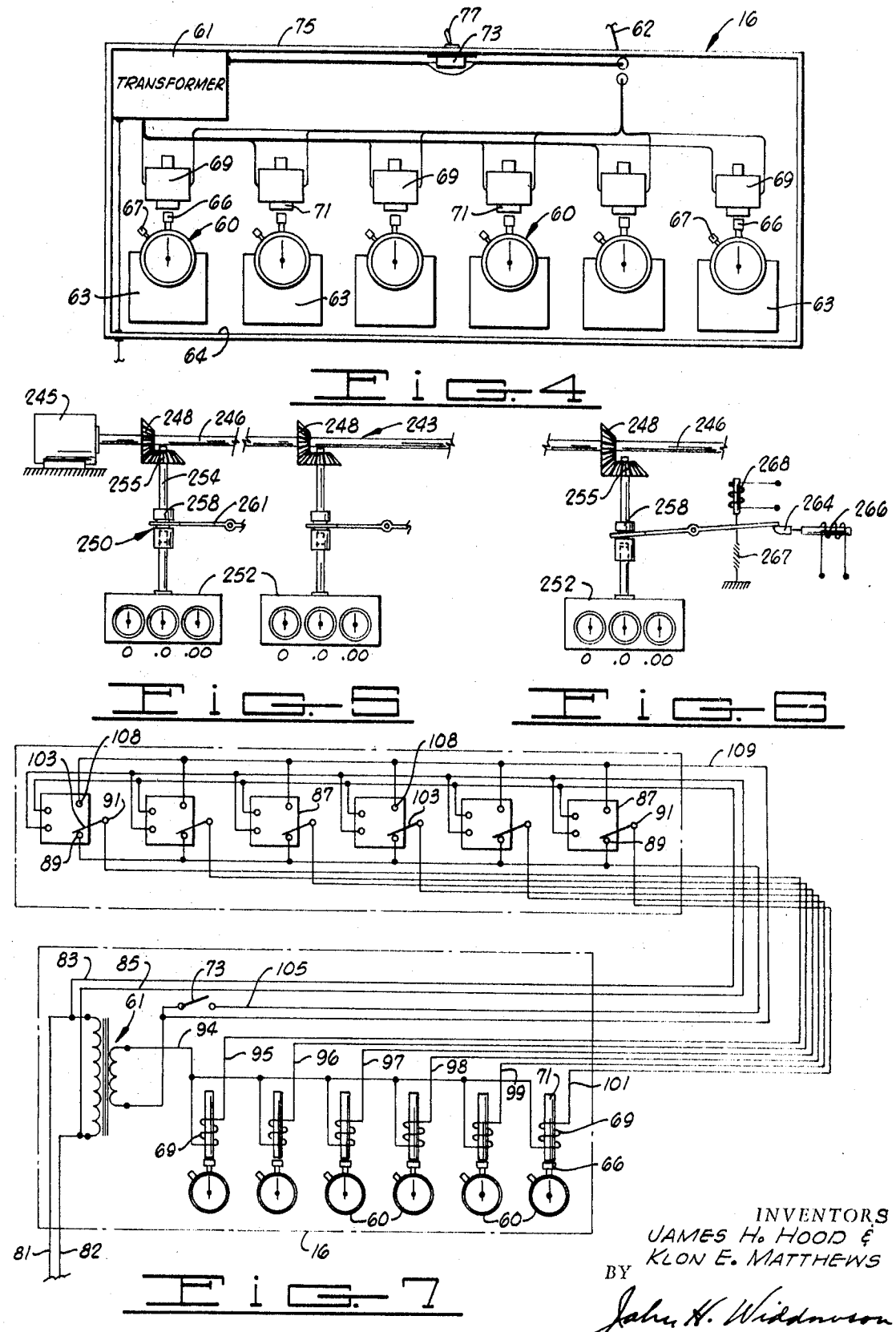

INVENTORS
JAMES H. HOOD &
KLON E. MATTHEWS
BY
John H. Widdowson
ATTORNEY

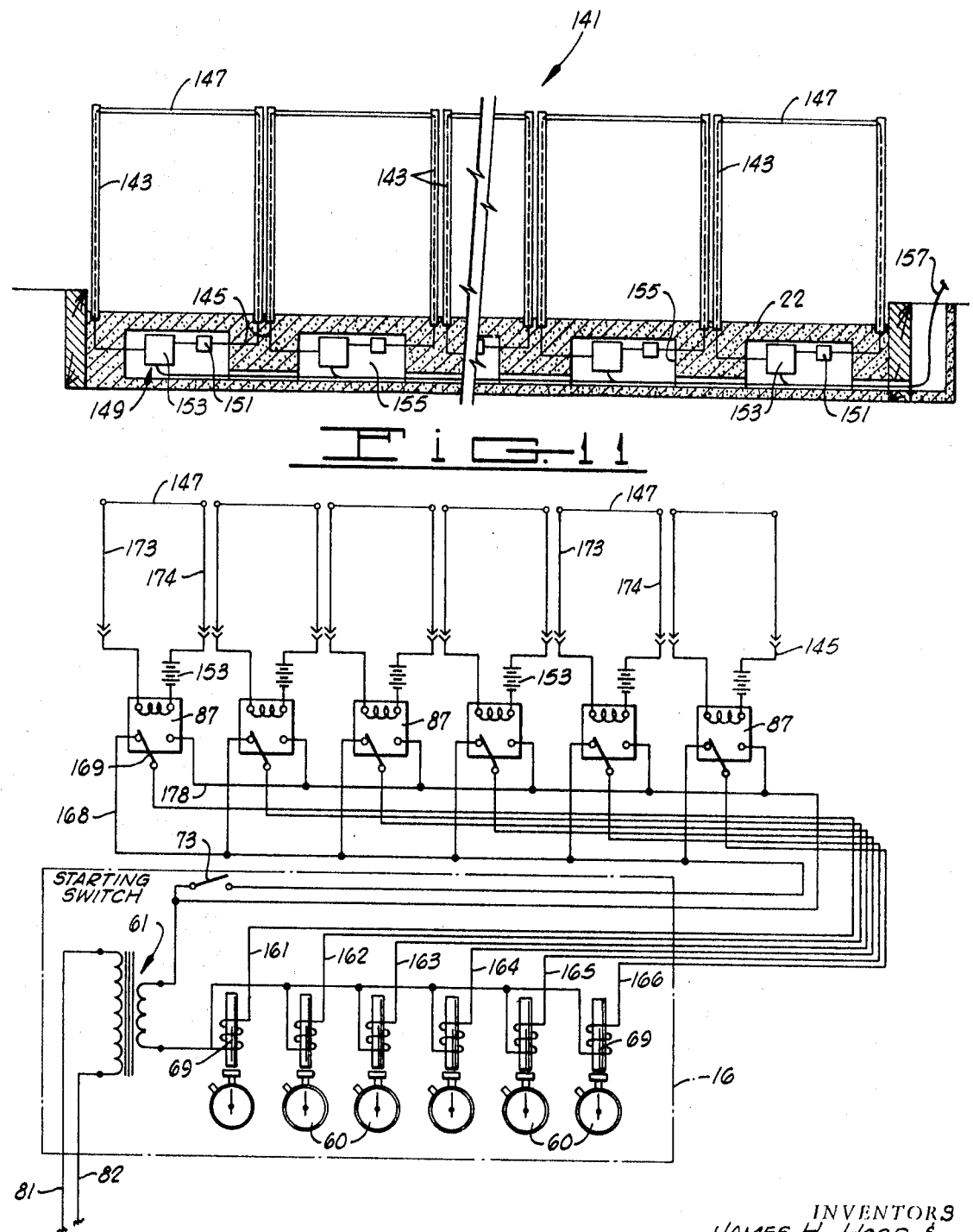

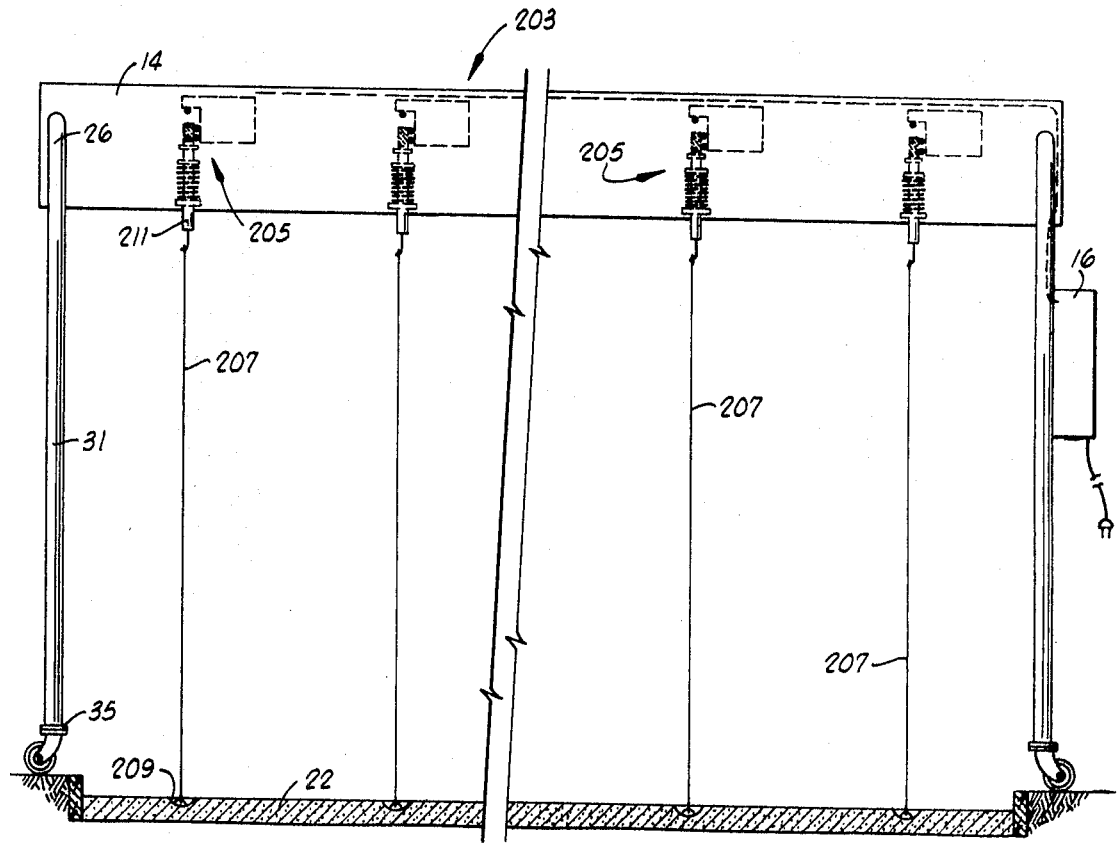
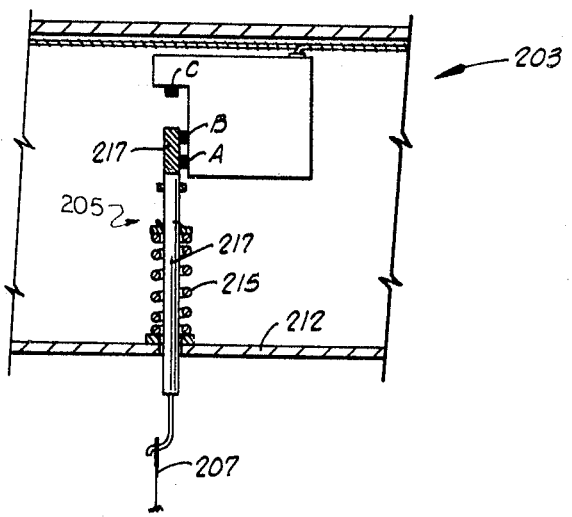

MULTIPLE TIMING APPARATUS FOR TRACK EVENTS AND THE LIKE

In many athletic events and particularly in field and track events found in high school and college competition, it is extremely difficult in order to find six or eight persons who are timers or judges of track running events and much time, effort, and expense is always involved in securing adequate and qualified judges and timers for track results. Numerous types of timing devices are known to the prior art but these devices are mainly very complicated electronic devices such as used in horse racing and are not practical for use in local track and field events. Additionally, the prior art devices are not operable to efficiently and effectively actuate conventionally available stopwatches and do not operate to individually record various times found in various tracks and racing devices. Also, the prior art devices are normally stationary structures and cannot be readily moved to various locations as needed in field and track running events. Also, the prior art devices are complicated in operation, expensive to manufacture, and provided with numerous moving parts which require expensive maintenance repair.

Numerous preferred embodiments of the timing apparatus of this invention are disclosed herein, namely, (1) a vertical photocell timing apparatus; (2) a horizontal photocell timing apparatus; (3) a horizontal mechanically actuated timing apparatus; (4) a horizontal electronic continuity timing apparatus; (5) a vertical ultrasonic timing apparatus; (6) a vertical mechanically actuated timing apparatus; and, additionally, a recording timer mechanism and a constant drive timer mechanism disclosed herein. The vertical photocell timing apparatus includes a main support frame assembly having a control panel secured to one end thereof; a plurality of amplifier devices mounted upon the upper surface of the support frame assembly; and a photocell assembly mountable within the supporting ground surface in operative alignment with the amplifier devices and operatively connected to the control panel for the operation thereof. Basically, the vertical photocell timing apparatus is operable to place a vertical photocell beam in successive ones of running lines used in track and field events whereupon the photocell beam is amplified by the amplifier device and sent to the control panel. In the control panel is an electronic circuit having a plurality of stopwatches activated by solenoid members to stop and start the respective stopwatches. On interrupting respective ones of the photocell beams as by an athlete crossing across the same, the same actuates the respective one of the solenoid members to operate the respective ones of the stopwatches to indicate the time at which the beam was crossed. The horizontal photocell timing apparatus is similarly operable except having a plurality of downwardly depending arms from the support frame assembly so as to provide for respective horizontal photocell beams operable in a similar manner to the prior device whereupon when racing between the downwardly depending arms, the photocell is broken to actuate the solenoid members and respective ones of the stopwatches. The horizontal mechanical actuated timing apparatus is also provided with a plurality of downwardly depending arms from the upper portion of the support frame and having a cord member anchored to one arm and extended to the opposite cooperating arm whereupon a mechanical spring and rod assembly is used to hold a block member secured to the cord which is in a taut condition. When a runner races through the depending arms, the cord and block is pulled from the spring and rod assembly to cause an electrical contact to operate the respective solenoid members to actuate the stopwatches to provide an accurate timing thereto. The vertical mechanical actuated timing mechanism operates similarly except having a vertically extended cord member to be broken so as to close respective electrical contacts. The horizontal electrical continuity timing apparatus is provided with a plurality of upright support posts electrically operable through a relay and battery assembly and having an upper portion electrically connected thereacross through the use of aluminum foil strips. On a track member racing through the upright posts, this operates to break the electrically conductive aluminum foil whereupon the same triggers a relay and respective stopwatch to indicate the time at which the strip was broken.

The vertical ultrasonic timing apparatus is substantially similar to the photocell timing apparatus except provided with ultrasonic transducers mounted on the upper portion of the support frame whereupon an electronic beam is rebounded from a reflecting point upon the support surface. When this ultrasonic beam is broken, the same operates to actuate a solenoid member and a stopwatch similar to the photocell devices. The recording timer mechanism is provided with a main roller drum structure having a calibrated, removable paper mounted thereon and driven by a constant speed timing motor. An impulse is directed to this recording timer mechanism to actuate respective ones of pen members through solenoid members to raise and lower the same into contact with the removable paper roll. Since the same is driven by a constant speed timing motor, it results in a permanent record of a given race and the respective pen members can be actuated through a photocell, aluminum continuity strips, mechanical devices, or the ultrasonic beam as desired. The constant drive timer mechanism is a mechanical system whereupon a timing motor drives a shaft member having a plurality of bevel gear members, each of which is operable to be connected to a mating bevel gear operable to drive a clock mechanism. A pair of solenoid members are operable to move the mating bevel gear members into contact to start the individual clock mechanism which operates to achieve great accuracy as the timing motor is continuously operating.

One object of this invention is to provide timing apparatus overcoming the aforementioned disadvantages of the prior art devices.

One other object of this invention is to provide a timer apparatus operable for use in athletic events to position a photocell beam across respective running paths and to operate through a control panel various stopwatches to indicate the respective times of the athletes within the respective running lanes.

Still, one other object of this invention is to provide a timer mechanism operable through a plurality of spaced post members interconnected as by an electrically conducting material whereupon the breaking of the same operates to set an impulse to a stopwatch mechanism to stop same and record the racing time.

Still, one further object of this invention is to provide a timer mechanism having a plurality of individual lanes with respective cords placed thereacross whereupon the movement of the cord member operates to actuate a control panel to record individually the respective times of each runner on a stopwatch mechanism.

Another object of this invention is to provide a timer apparatus having a constant drive timing motor and solenoid members operable to place individual clock mechanisms into driving engagement with the timing motor to achieve the most accurate results therefrom.

One further object of this invention is to provide a timer apparatus including a recording drum mechanism operable through a constant speed timer motor and a plurality of spaced pen members to record individual times of a given race upon a permanent calibrated removable paper roll for permanent records.

Still, another further object of this invention is to provide a timing apparatus utilizing ultrasonic beams whereupon the breaking of the same as by a runner operates to actuate individual timing mechanisms.

Various other objects, advantages, and features of the invention will become apparent to those skilled in the art from the following discussion, taken in conjunction with the accompanying drawings, in which:

FIG. 4 is an enlarged view of the control panel of the photocell timing apparatus of this invention having a front lid removed for clarity;

FIG. 5 is a fragmentary elevational view of a constant drive timer mechanism of the timing apparatus of this invention;

FIG. 6 is a view similar to FIG. 5 illustrating the movement to the inactive position of the constant drive timer mechanism;

FIG. 7 is an electrical schematic diagram for the photocell timing apparatus of this invention;

FIG. 11 is a foreshortened elevational view of the horizontal electrical continuity timing apparatus of this invention;

FIG. 12 is an electrical schematic of the electrical continuity timing apparatus of FIG. 11;

FIG. 15 is a foreshortened elevational view of a vertical mechanical actuated timing apparatus of this invention; and FIG. 16 is an enlarged elevational view of the electrical contacts of the timing apparatus shown in FIG. 15.

Figure 1:
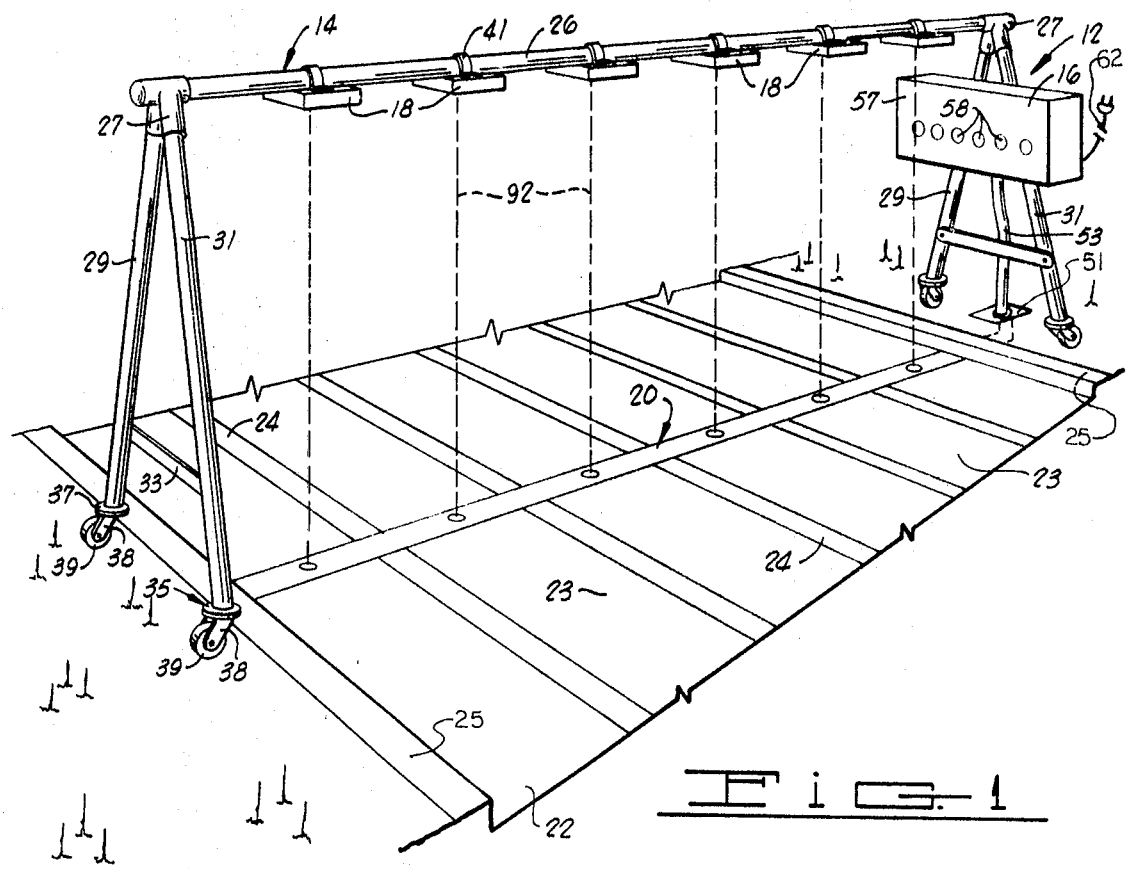
FIG. 1 is a perspective view of a vertical photocell timing apparatus of this invention.

The following is a discussion and description of the preferred specific embodiments of the new timing apparatus of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a vertical photocell timing apparatus, indicated generally at 12, includes a main support frame assembly 14; a timing means or control panel 16 secured to one end of the support frame assembly 14; a timing means or control panel 16 secured to one end of the support frame assembly 14; a plurality of signal receiver means or amplifier devices 18 secured to the upper portion of the support frame assembly 14; and a signal generator means 20 mounted within a supporting surface 22 and operably connected to the control panel 16. It is seen that the supporting surface 22 is preferably divided into a plurality of separate lanes 23 as indicated by the lines 24 whereupon the same is recessed by curb members 25 to define a substantially conventional running track.

The support frame assembly 14 includes an elongated horizontal support pipe 26 joined as by connector members 27 at opposite ends to downwardly divergent support legs 29 and 31. It is seen that the support pipe 26 is of a length so as to extend across the entire lanes 23 and of a sufficient height upon the support legs 29 and 31 to allow runners to run thereunder. The support legs 29 and 31 are interconnected as by a crossbar 33 for rigidity and having the lower ends thereof secured to wheel assemblies 35, respectively. The wheel assemblies 35 each include a support base 37 having downwardly depending arms 38 with a wheel member 39 rotatably mounted therein. The wheel assemblies 35 are provided with substantially conventional lock members (not shown) to secure the same in the desired location. The amplifier devices 18 are individually mounted upon the support pipe 26 by bracket straps 41 in a predetermined, equally spaced position therealong so as to be aligned with respective ones of the elements in the signal generator means 20. The amplifier devices 18 are provided with receiving elements adapted to receive and amplify a photoelectric signal and is electrically connected to the control panel 16.

Figure 2:
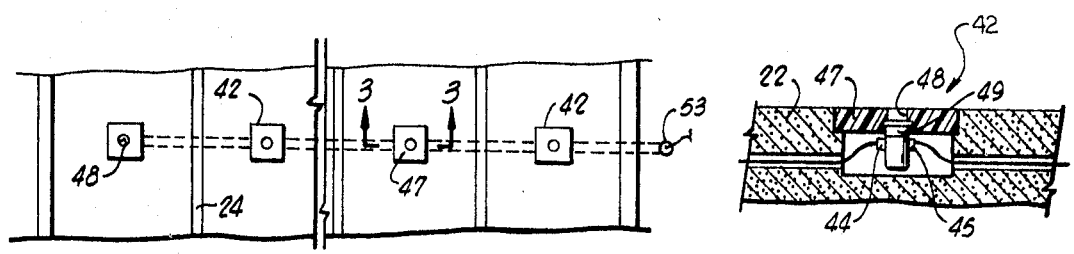
FIG. 2 is a foreshortened top plane view of the signal generator means of the vertical photocell timing apparatus of this invention.
Figure 3:
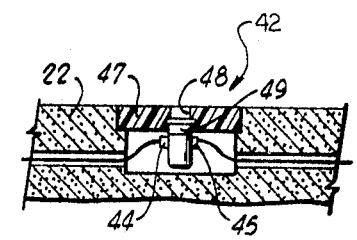
FIG. 3 is an enlarged fragmentary sectional view taken along line 3-3 in FIG. 2.

As shown in FIGS. 2 and 3, the signal generator means 20 includes a plurality of signal elements 42, each interconnected by male and female adapters 44 and 45 so that a series of such elements may be used and are embedded within the support surface 22. Each photocell element 42 includes a molded support block 47 having a central opening 48 to receive in a recessed manner a bulb 49 for directing a beam upwardly into respective ones of the amplifier devices 18. It is seen that the molded block 47 is such as to provide a rigid support without damage to the bulb 49 on running thereover. Additionally, it is obvious that various forms of the signal generator means 20 could be so constructed such as a continuous elongated strip to be placed across the track in order to provide the necessary electric beam. It is seen that the signal generator means 20 terminates in an adapter plug 51 operable to be connected as by a cable member 53 to the control panel 16.

As seen in FIGS. 1 and 4, the control panel 16 includes a main support housing 55 having a front lid member 57 hingedly mounted thereon and movable to the opened condition to reveal the contents therein. It is seen that the front lid member 57 is provided with a plurality of spaced openings 58 so as to reveal stopwatch mechanisms 60 contained within the housing 55. The housing 55 is provided with external power through a conduit member 62 to provide a 110 voltage current to a transformer 61 mounted in one corner. A plurality of block members 63 are mounted upon a bottom wall 64 of the housing 55 each adapted to hold therewithin a respective one of the stopwatch mechanisms 60 in an upright position as seen in FIG. 4. Each stopwatch mechanism 60 is provided with a stop/start pushbutton 66 and, additionally, a reset button 67 on one side thereof. Although six stopwatches are illustrated, it is obvious that any number could be used. Mounted in the housing 55 directly above each of the stopwatch mechanisms 60 is a solenoid member 69 having an upright axially movable plunger 71 which is operable to depress the respective stop/start buttons 66 for the timed operation of the respective stopwatch mechanisms 60 as will be explained. Additionally, a special actuating switch 73 is mounted in a top wall 75 of the housing 55 having an upper toggle lever 77 operable to momentarily close the circuit to all of the solenoid members 69 for reasons to become obvious when starting a race.

In best understanding the operation of the vertical photocell timing apparatus 12, refer to FIG. 7 wherein a schematic shows the desired operation through a circuit means. For example, a pair of lines 81 and 82 supply power to the transformer 61 to convert the same from 110 to 24 volts. Lines 83 and 85 are directed to each of a plurality of relays 87 mounted within the respective amplifier devices 18 in which the contacts 89 and 91 in each one thereof is deenergized on breaking of the respective photocell beams indicated at 92 in FIG. 1. As shown on the 24-volt side of the transformer 61, power is fed through line 94 to each of the solenoid members 69 mounted above the respective stopwatch mechanisms 60. The other side of the respective solenoid members 69 are connected as by respective lines 95, 96, 97, 98, 99, and 101, to respective ones of the photocell relays 87. This would appear to supply power to respective lever contacts 103 on the relays 87 to complete the circuit to the respective solenoid members 69. However, it is seen that a common line 105 to the relays 87 goes through the actuating switch 73 to the 2-volt power source. It is to be noted that breaking of the photocell beams 92 in respective ones in the relays 87 operates to move the respective lever contact 103 from the position of FIG. 7 to an upward position contacting a contact point 108 which is common through a line 109 to the power source. This operates through the respective ones of the lines 95, 96, 97, 98, 99 and 101 to energize respective ones of the solenoid members 60 so as to actuate the start/stop buttons 66.

In the use and operation of the vertical photocell timing apparatus 12 of this invention, it is noted that the operator first actuates the start switch 73 on seeing smoke from a starting gun for example, whereupon this operates to complete the circuit through lines 105, 94—99 and 101 and the closed levers 103 in all of the relays 87 to momentarily depress the respective plungers 71 on the solenoid members 69 to depress the start/stop button 66 on the respective stopwatch mechanisms 60 to start the same in their timing function. The start switch 73 immediately releases to release the solenoid members 69 whereupon the timing proceeds. Upon a runner racing through the support frame assembly 14 and breaking a respective one of the photocell beams 92, this operates to actuate a relay 87 and move the respective lever 103 into contact with its respective contact point 108 so as to operate respective ones of the solenoid members 69 to again depress the start/stop button 66 on the respective stopwatch mechanism 60 to stop the same as a timing function. It is noted that this would also occur in each and every one of the racing lanes 24 on breaking the respective one of the photocell beams 92 with each individual runner accurately and automatically timed on passing the finish line.

Figure 8:
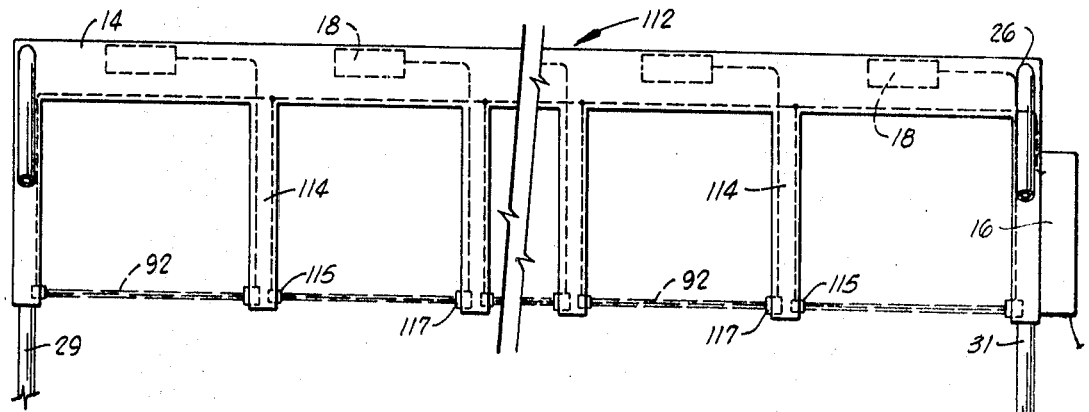
FIG. 8 is a fragmentary foreshortened elevational view of a horizontal photocell timing apparatus of this invention.

In another embodiment as shown in FIG. 8, a horizontal photocell timing apparatus 112 is provided having substantially the same upright support frame assembly 14, a support pipe 26 with downwardly depending support legs 29, 31, and the control panel 16 mounted on one end thereof. However, the support pipe 26 is provided with downwardly depending support arms 114 spaced apart a predetermined distance so as to permit a track runner to easily pass therebetween and having the same defining respective ones of the track lanes 24. As shown in FIG. 8, the left-hand arm 114 of each pair is provided with a photocell light source 115 and a photosensitive element 117 mounted in the adjacent oppositely opposed one of the arms 114. This operates to generate a photocell beam 92 therebetween similar to the vertical setup as set forth in the timing apparatus 12. It is seen that the control panel 16 is substantially similar to that described in FIGS. 4 and 7 and operable to actuate respective ones with stopwatch mechanisms 60 as previously described. It is seen that the horizontal photocell timing apparatus 112 is self-contained without requiring accurate alignment with a signal generator means 20 mounted within the support surface 22.

Figure 9:
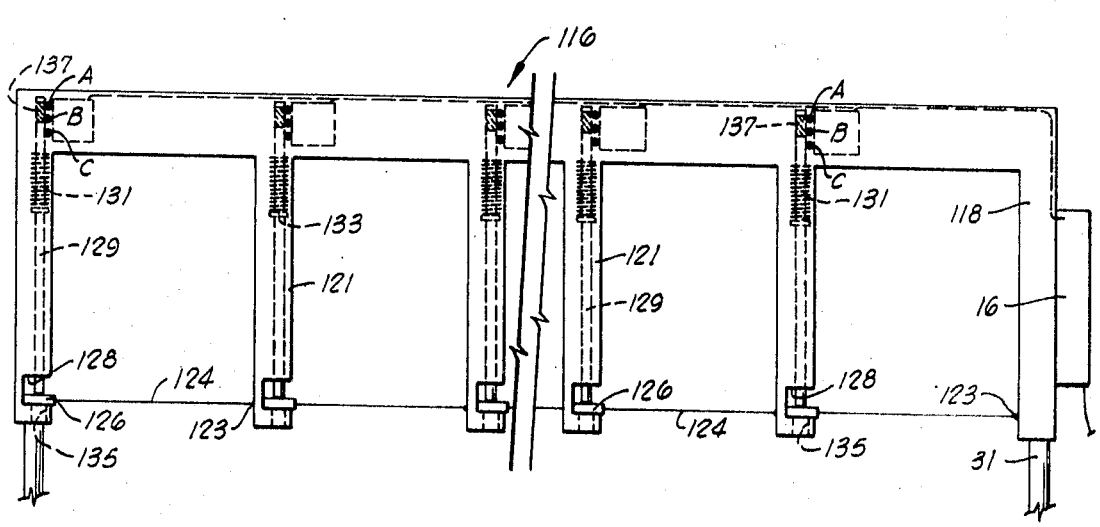
FIG. 9 is a foreshortened fragmentary elevational view of the horizontal mechanical actuated timing apparatus of this invention.

As shown in FIG. 9, in another embodiment a horizontal mechanical actuated timing apparatus 116 includes a support frame assembly 118 also having a plurality of downwardly depending support arms 121 spaced equal to respective ones of the racing lanes 23 in the racing track. Secured to each support arm 121 is an anchor member 123 having a cord 124 connected thereto with the opposite end secured to a block member 126 mounted within a U-shaped opening 128 in the opposed ones of the support arms 121. Mounted within each support arm 121 is an upright actuator rod 129 positioned with its lower surface on the upper surface of the block member 126 and biased downwardly into such a position by a spring member 131 mounted against a lug 133 on the actuator rod 129. The lower end of the actuator rod 129 is aligned with a hole 135 in the lower end of the support arm 121 and would move into same if not for the block member 126 supporting the same. The upper end of the actuator rod 129 is provided with an electrical contact portion 137 which completes the continuity through contacts A and B or B and C as illustrated in FIG. 9. The closed contacts A and B permit the solenoid members 69 to be energized by a start switch 73 as set forth in FIG. 7. On removing the block member 126, the actuator rod 129 would move downwardly to close contacts B and C and energize a solenoid member 69 to actuate a respective stopwatch mechanism 60 as previously described. Additionally, the rod 129 would move down sufficiently to break continuity with contacts B and C so such action is only momentarily which all that is necessary to stop respective ones of the stopwatch mechanism 60. It is obvious that the electrical circuit as described in FIG. 7 would be operable through a control panel 16 in the horizontal mechanical actuated timing apparatus 116 to actuate the respective stopwatch mechanisms 60 as previously described. The main difference between this timing apparatus 116 and the others previously described is merely the use of a positive cord member with a mechanical operation to vary the contacts through A, B, and C similar to the relays 87 as described in FIG. 7.

As shown in FIG. 11, a horizontal electrical continuity timing apparatus 141 includes a plurality of upright post members 143 having electrical conduits 145 therethrough and upper ends of the post members 143 connected to electrical continuity foil strips 147 thereacross. Mounted between each respective ones of the upright post members 143 is a control mechanism 149 being a relay 151 and a battery member 153 to supply the power to the foil strips 147 wherein the battery supplies a low voltage. It is to be noted that these foil strips 147 are placed so as to be easily broken by persons running through the upright post members 143 which electrically operates the electrical schematic for the respective ones of the stopwatch mechanisms 60 as clearly shown in FIG. 12. It is obvious that the upright post members 143 may be made of a sturdy but resilient material so that the runners will not be injured on accidentally hitting the same. It is seen that special cavities 155 are provided to receive the respective relays 151 and battery members 153 having an outer common electrical conduit cord 157 leading to the control panel 16.

As shown in FIG. 12, an electrical schematic is illustrated for the horizontal electrical continuity timing apparatus 141 having the transformer 61 powered similarly by lines 81 and 82 to convert the power from 110 to 24 volts. The stopwatch mechanism 60 are similarly actuated by respective solenoid members 69 and having the same interconnected as by lines 161–166, inclusive, to respective ones of the relays 87 which are connected to a common line 168 by levers 169 through start switch 73. It is seen that the start switch 73 is operable to momentarily actuate the solenoid members 69 at the same time for the starting function of a given race. The relays 87 are powered through lines 173 and 174 connected to the foil strips 147 by the respective battery members 153 connected thereto. This is so that a very low voltage is all that is necessary through the respective strips 147 so as to not present dangerous conditions. On breaking the continuity through the foil strips 147, the respective ones of the relays 87 are deenergized to move the lever 169 to close the same to a common line 178 and operable to respective ones of lines 161—166, inclusive to actuate respective ones of the stopwatch mechanisms 60.

Figure 13:
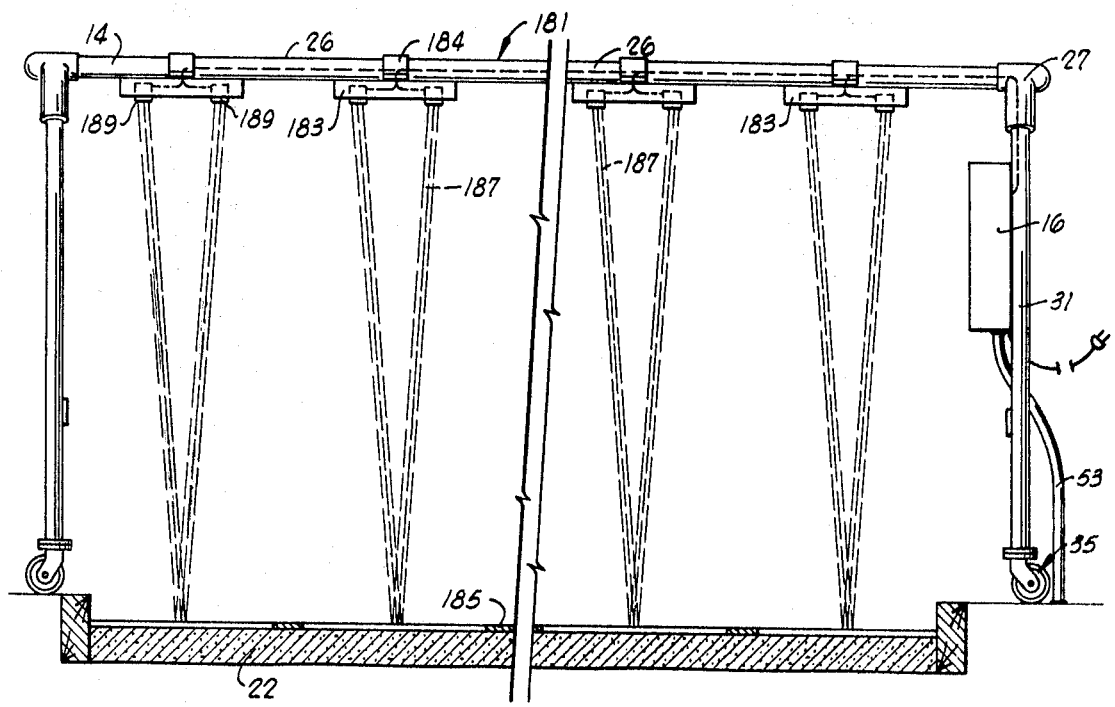
FIG. 13 is a foreshortened elevational view of the vertical ultrasonic timing apparatus of this invention.
Figure 14:
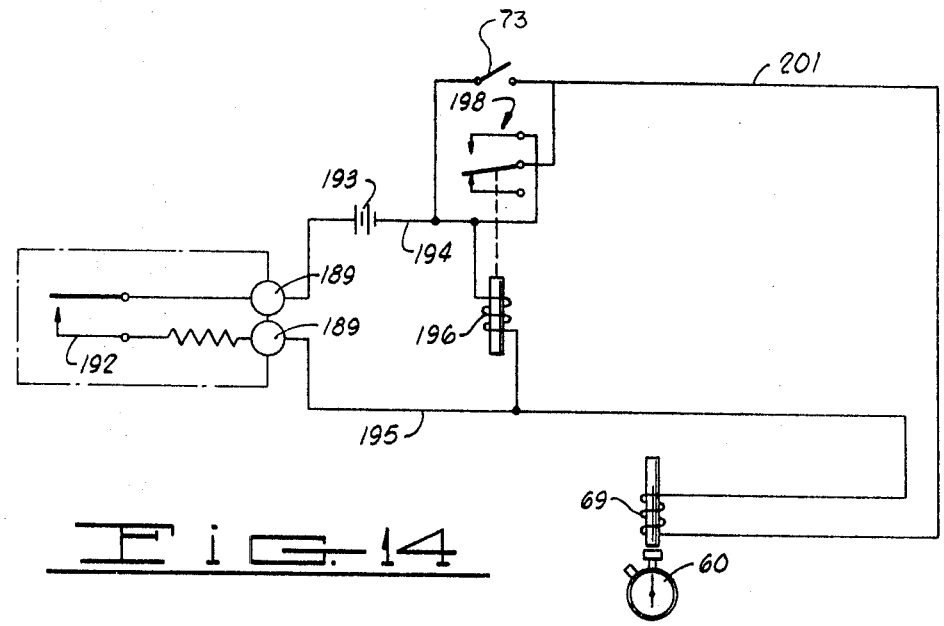
FIG. 14 is a schematic diagram of the ultrasonic timing apparatus of FIG. 13.

In FIGS. 13 and 14 is illustrated a vertical ultrasonic timing apparatus 181 provided with the upright support frame assembly 14 having the control panel 16 mounted upon one end and a plurality of spaced amplifier structures 183 secured as by bracket members 184 to the upper support pipe 26. On the support surface 22 is provided an elongated strip or reflecting member 185 operable to reflect ultrasonic sound beams 187 received from spaced cooperating transducers 189 in each one of the amplifier structures 183. The use of ultrasonic beams 187 achieves the same general function in this timing apparatus 181 as previously described for the use of a photocell beam as the same is operable on interruption to submit a signal into the control panel 16 to operate respective ones of the stopwatch mechanisms 60 through the solenoid members 69.

As shown in FIG. 14, it is seen that the transducers 189 are operable to present a closed circuit through the beams indicated at 192. The transducers 189 are powered by a battery 193 through lines 194 and 195 to solenoid member 196 and operable to move a relay 198. Additionally, line 194 is connected through line 201 to the solenoid member 69 above a respective one of the stopwatch mechanism 60. It is seen that the circuit is provided with a starting switch 73 which is operable to energize the solenoid member 69 to actuate the stopwatch mechanism 60 for the starting function. This immediately releases whereupon the next actuation of the solenoid member is taken over by the ultrasonic beam 187. When a runner breaks the respective ultrasonic beam 187, it is seen that this deenergizes the activated solenoid member 196 whereupon the circuit is then closed through lines 194 and 201 to the solenoid member 69 to again actuate the stopwatch mechanism 60. Although all of the various stopwatches and solenoid members have not been illustrated in this embodiment, it is obvious that the same will operate substantially similar to that of FIGS. 7 and 12.

As shown in FIGS. 15 and 16, another embodiment includes a vertical mechanical actuated timing apparatus 203 having the support frame assembly 14 and a control panel 16 secured to one end thereof. This timing apparatus 203 includes a mechanical actuator 205 secured to the support pipe 26 and connected by respective cord members 207 anchored in recesses 209 in the support surface 22. Each mechanical actuator 205 includes a rod member 211 biased upwardly from a plate member 212 by a compression spring 215 which maintains the cord member 207 taut. The upper end of the rod member 211 is provided with a conductor strip 217 touching contacts A and B in the lower condition and contacts B and C in the upper condition. These contacts are electrically connected to the control panel 16 similar to FIG. 7; therefore, detailed discussion thereof is not deemed necessary.

Contacts A and B are operable on use of the starting switch 73 to actuate the solenoid members 69 for the starting function. On breaking the respective cord members 207, the contacts B and C operate to actuate the stopwatch mechanism 60 as previously described. It is seen that timing apparatus 203 operates similarly to the horizontal mechanical actuated timing apparatus 116 except the support arms 121 are not present.

Figure 10:
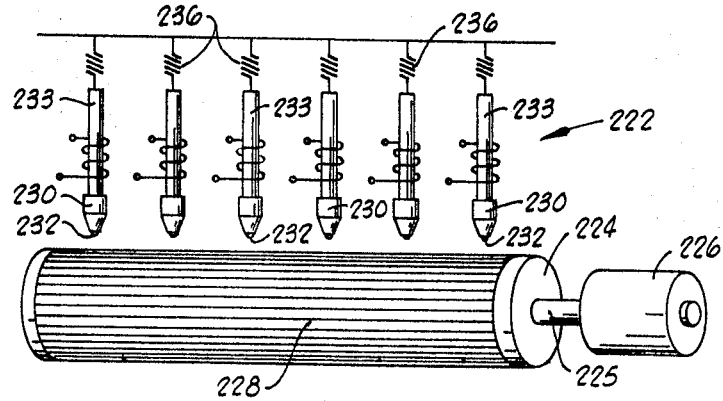
FIG. 10 is a schematic diagram of the recording timer mechanism of this invention.

As shown in FIG. 10, it is seen that a recording timer mechanism 222 may be used as part of the timing means which includes a rotatable drum member 224 connected by a shaft member 225 to a constant speed timing motor 226. This rotational speed is correlated to a calibrated, removable, cylindrical paper roll 228 mounted on the drum member 224 having a plurality of lines thereon to indicate time increments. A plurality of individual vial members 230 with ballpoint pens 232 are operable to move axially through the use of respective solenoid members 233 into contact with the paper roll 228. The pens 232 are held in upright deenergized positions by spring members 236 and movable downwardly into contact with the calibrated paper roll 228 by the solenoid members 233. It is obvious that the solenoid members 233 can be energized and controlled through the use of a mechanical gear device, ultrasonic beam, photocell beam, or the mechanical cord and block structures to show a visual record of the results of a given race. It is seen that this is very desirable because after a race, the calibrated cylindrical paper roll 228 can be removed and taken to a judges stand whereupon the accurate time of each member in the race can be read therefrom and, additionally, this provides a permanent record which is very desirable in training the various athletes to note improvement, etc.

As shown in FIGS. 5 and 6, a constant drive timer mechanism 243 may be used as part of the timing means including a constant rotating motor 245 having an output shaft 246 provided with a plurality of spaced beveled gears 248 mounted thereon. Each of the beveled gears 248 is connected through a timer actuator assembly 250 to respective clock mechanism 252. Each timer actuator assembly 250 is provided with an upright shaft 254 having a beveled gear 255 at the upper end engageable with one of the other beveled gears 248 and having the lower portion of the shaft 254 operable to start and stop the clock mechanism 252 similar to the stopwatch mechanisms 60. A yoke member 258 is mounted about a central portion of the shaft 254 and engageable with one end of a fork member 261. The fork member 261 is pivotally mounted at a central portion and having its outermost end engageable with a lever member 264 actuated by a solenoid member 266. An intermediate portion of the fork member 261 is biased in one direction by a spring member 267 and movable in the opposite direction by a second solenoid member 268. As shown in FIG. 6, this is in the inactive position whereupon the timing motor 245 always rotates so that there is always the steady momentum to the timing shaft 246. On activating the start switch (not shown) the solenoid member 266 retracts the lever member 264 so that the shaft 254 is moved upwardly under force of the spring member 267 to engage the beveled gears 248 and 255. This operates to actuate the clock mechanism 252 for the desired timing motion. On breaking a mechanical cord, electrical foil, ultrasonic beam or photoelectric cell, the other solenoid member 268 is actuated so as to pivot the fork member 261 out of engagement with the beveled gears 248 and 255 to the stopped condition. The loose end of the fork member 261 is thereupon held by the lever member 264 connected to the solenoid member 266 so as to be inactive. It is noted that this embodiment is very important in providing an accurate structure for achieving the utmost accuracy through the clock mechanism without inaccuracies attributed to starting and stopping momentums.

In the use and operation of the various embodiments of the timing apparatus of this invention, it is seen that the same is operable to present a needed structure for track running events. The timing apparatus provides a means to project signals across running lanes and actuate stopwatches in a control panel to provide accurate records of times in given racing events. It is also seen that the timing apparatus of this invention is economical to manufacture, substantially maintenance free, and does not require the large capital which is not available to the lower educational institutions of today. Additionally, the timing apparatus of this invention eliminates need for finding qualified and trained timers for various races which always requires at least six or eight persons with great chance of error therefrom.

It is noted that the various embodiments of the mechanical cords, photocell beams, and ultrasonic beams may be used in numerous combinations with the constant drive timer mechanism, the recording timer mechanism, or the stopwatch mechanisms to achieve the desired result.

While the invention has been described in conjunction with preferred specific embodiments thereof, it will be understood that this description is intended to illustrate and not to limit the scope of the invention, which is defined by the following claims.

We claim:
1. A timing apparatus adapted to measure and record various times from individual racing lanes, comprising:
   a. a support frame assembly to straddle a plurality of the racing lanes,
   b. signal generator means to place an output beam of energy within respective ones of the racing lanes,
   c. a plurality of signal receiver means supported on said frame assembly in operating cooperation with respective ones of said signal generator means,
   d. timing means operably connected to said signal receiver means operable on interruption of a signal between said generator means and said receiver means to record the actual time of interruption of said beam of energy in individual ones of the racing lanes,
   e. said timing means including an electrical circuit means operably connected to timer assemblies associated with respective ones of said signal receiver means, and a start switch means connected to all of said timer assemblies to simultaneously actuate said timer assemblies to start recordation of time required for the start of a race.
2. A timing apparatus as described in claim 1, wherein:
   a. said signal generator means and said signal receiver means both connected to said support frame assembly in a spaced relationship to project an ultrasonic signal against a reflecting surface on the racing lanes in order to receive the same and complete the circuit,
   b. interruption of said ultrasonic beam operable to actuate said timing means, and
   c. said timing means including said electrical circuit means having first solenoid members operable by said signal receiver means to actuate second solenoid members to operate respective timing elements for a stopping function, and said start switch in said circuit means connected to said second solenoid members to actuate all of same concurrently as a starting function.

3. A timing apparatus as described in claim 1, wherein:
a. said timing means including a rotatable drum member having a calibrated paper roll thereover and driven by a constant speed timing motor, and a plurality of spaced pen members, each individually actuated by said signal receiver means into contact with said calibrated paper roll for readily indicating accurate and visual results of a race in the various racing lanes,
b. said electrical circuit means connected to a plurality of solenoid members, and
c. said solenoid members operably connected to respective ones of said pen members to move same into and out of engagement with said paper roll on interruption of said signals between said generator means and said receiver means.

4. A timing apparatus as described in claim 1, wherein:
a. said timer assemblies including a plurality of various timer elements to be operated by said beams of energy in respective ones of the racing lanes and a plurality of actuator members in cooperative alignment with said timer elements for operating the same on start and stop conditions,
b. said actuator members each respectively operated on receiving a signal through said circuit means from said signal receiver means operable to start and stop each said timer element,
c. said actuator members being electrical solenoid members selectively operable to actuate a start/stop button on respective ones of said timer elements,
d. said circuit means having a plurality of relay members operably connected, respectively, to said solenoid members for operating the same, and
e. said start switch operable to momentarily and concurrently actuate said relay members to operate said solenoid members to serve as a starting function whereupon all of said timing elements are operable at the same time; and said relay members operable on interrupting said beam of energy between said signal generator means and said signal receiver means to operate respective ones of said relays, said solenoid members, and said timer elements to serve as the stopping function.

5. A timing apparatus as described in claim 4 wherein:
a. said timer elements each being a stopwatch mechanism having one of said stop/start buttons and a reset button thereon operable to efficiently and effectively record times of persons running in the individual racing lanes.

6. A timing apparatus as described in claim 1, wherein:
a. said timer assembly including a constantly moving timing motor having a drive shaft interconnected as by gear members to respective ones of clock mechanisms, and
b. said circuit means including solenoid means operable to move a portion of said clock mechanisms in and out of engagement with said gear on said drive shaft for a starting and stopping function thereof whereupon said timing motor is constantly rotating so as to eliminate errors from the various starting and stopping torques found in any motor.

7. A timing apparatus as described in claim 6 wherein:
a. said clock mechanism including a driven shaft with one end connected to a timer member, one of said gears secured to the other end of said driven shaft, and a yoke assembly connected to said driven shaft for moving same axially to connect and disconnect said gear members.

8. A timing apparatus as described in claim 7, wherein:
a. said yoke assembly having an actuator rod connected to said solenoid member and a spring member connected to said actuator rod to bias same into connection of said gear members with said solenoid members operable to bias said gear members out of engagement, and secondly, to hold same in such position.

9. A timing apparatus adapted to measure and record various times from individual racing lanes, comprising:
a. a support frame assembly extended transversely of a plurality of the racing lanes,
b. mechanical actuator means connected to said frame assembly having trip means extended transversely of respective ones of the racing lanes,
c. timing means operably connected to said mechanical actuator means operable on moving said trip means to record accurate time of crossing individual ones of the racing lanes,
d. said support frame assembly including a plurality of downwardly depending support arms,
e. said trip means including a cord member extended between said downwardly depending arms and held in a position by an actuator assembly,
f. said actuator assembly including an actuator rod member operably connected to said cord member to hold the same in the taut position and movement of said cord member as by a runner operates to move said actuator rod to deenergize said timing means and record time of the interruption, and
g. said rod members operable to provide a signal in said circuit means to operate said timing assemblies to record, respectively, lateral movement of said cord members thereacross.

10. A timing apparatus as described in claim 9, wherein:
a. said timing means including a rotatable drum member having a calibrated paper roll thereover and driven by a constant speed timing motor, and a plurality of spaced pen members, each individually actuated by said signal receiver means into contact with said calibrated paper roll for readily indicating accurate and visual results of a race in the various racing lanes.

11. A timer apparatus adapted to measure and record various times from individual racing lanes, comprising:
a. a plurality of spaced upright support posts each having an electrical conduit therein, said support posts connected to a support surface defining the racing lanes,
b. electrical continuity means operably connected between adjacent upper ends of said support posts to respective ones of said electrical conduits to provide electrical continuity therebetween,
c. signal receiver means mounted in the support surface including a battery member and a relay member electrically connected through said electrical conduits to said continuity means, and
d. timing means operably connected to said signal receiver means and having electrical circuit means connected to timer assemblies whereupon breaking of said continuity means operates to immediately actuate said timer assemblies for starting and stopping functions of a given race.

12. A timer apparatus as described in claim 11, wherein:
a. said continuity means being individual foil strips between said support posts, and
b. said battery is of low voltage and operably connected to said strips whereas a person running in said individual racing lanes hitting said strips will not receive a shock therefrom.

13. A timer apparatus as described in claim 12, wherein:
a. said timing means including a rotatable drum having a calibrated paper roll thereon driven by a constant speed timing motor, and a plurality of spaced pen members each operably connected to said strips by said circuit means to receive signals from various ones of the racing lanes whereupon the actual results of a race may be readily and permanently recorded on said calibrated paper roll.